United States Patent [19]
Haddad et al.

[11] 3,887,436
[45] June 3, 1975

[54] CELL CULTURING SYSTEM

[75] Inventors: Ihsan A. Haddad, Bedford; Alvin R. Arsenault, Burlington, both of Mass.

[73] Assignee: Instrumentation Laboratory, Incorporated, Lexington, Mass.

[22] Filed: May 31, 1973

[21] Appl. No.: 365,535

[52] U.S. Cl. .............. 195/142; 195/127; 137/317; 417/474; 195/1.7
[51] Int. Cl. ............................................ C12b 1/00
[58] Field of Search ................... 195/142, 104, 127

[56] References Cited
UNITED STATES PATENTS
3,276,589  10/1966  Jankay .............................. 195/142

*Primary Examiner*—Alvin E. Tanenholtz

[57] ABSTRACT

A cell culture system includes an incubator chamber, support in the chamber for a plurality of cell culture chambers, a manifold structure having supply and return conduits, detachable coupling structure for connecting the cell culture chambers to the manifold structure and pump structure for circulating nutrient material between the manifold structure and the connected cell culture chambers.

7 Claims, 13 Drawing Figures

PATENTED JUN 3 1975 3,887,436
SHEET 2

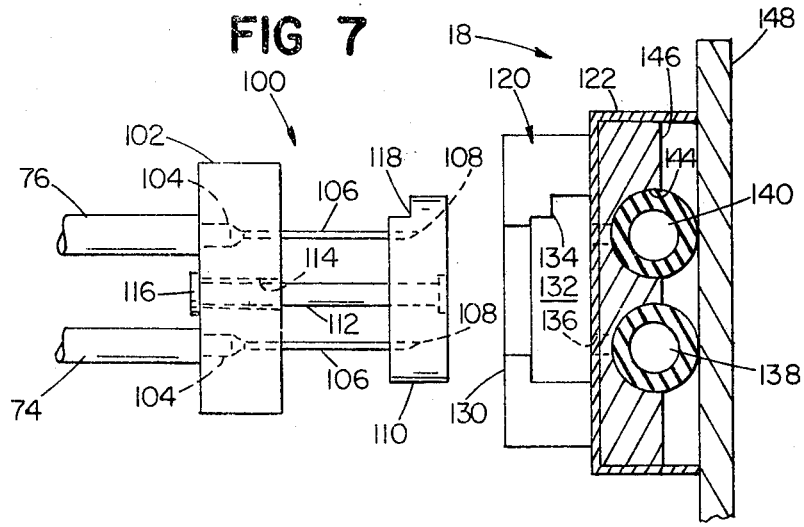
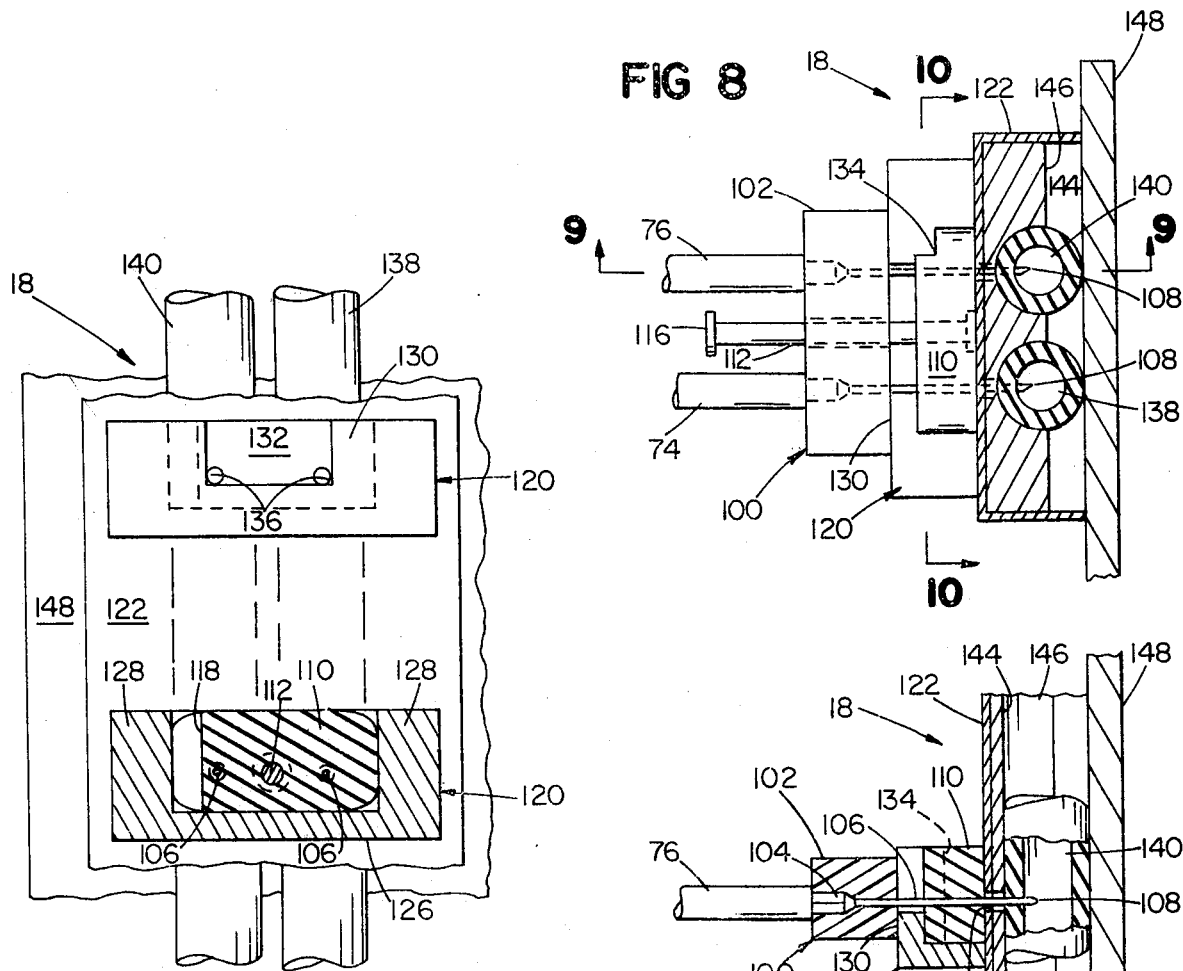
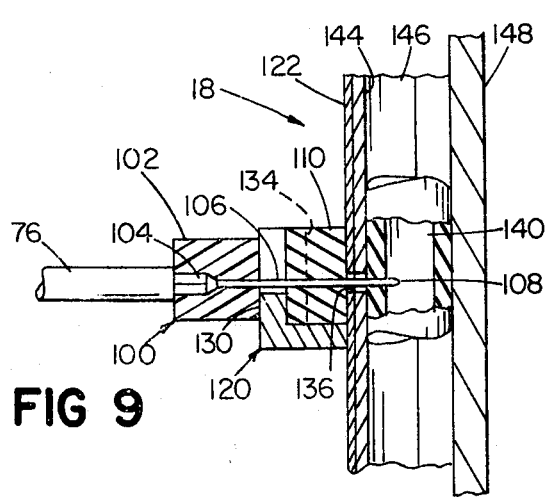

CELL CULTURING SYSTEM

SUMMARY OF INVENTION

This invention relates to fluid handling apparatus and more particularly to systems and apparatus particularly useful in systems for cell culture, and especially to novel and improved systems particularly adapted for large scale cell culture in which the conditions in both liquid and gaseous phases in the culture environment are monitored to provide an environment conducive to cell growth.

Numerous cell propagation arrangements have been proposed in which conditions are established which approach the cell environment in the intact animal. An example of such a proposed system is described in the article "Cell Propagation on Films of Polymeric Fluorocarbon as a Means to Regulate Pericellular pH and $PO_2$ in Cultured Monolayers," Munder et al., FEBS Letters, Vol. 15, No. 3, June, 1971, page 191.

An object of this invention is to provide improved apparatus for the large scale culturing of cells and similar material, for example cells of animal origin. Ample supplies of cells are required for virus vaccine manufacture. Similarly, microbiologists require substantial supplies of cells, for example for cancer research and invitro growth of animal viruses. The handling of such materials, for example biological serums, nutrient media, cell cultures and other biological samples require a sterile exchange of fluids. Where the fluids are toxogenic, particular care is required in their handling. It is another object of this invention to provide novel and improved arrangements for handling biological media.

A more specific object of the invention is to provide novel and improved replaceable arrangements for use in cell culture systems.

Still further objects of the invention are to provide novel and improved valving and coupling arrangements for biological fluids.

In accordance with one feature of the invention there is provided a replaceable, sterilizable, cell growth assembly that includes a chamber of gas permeable liquid impermeable material having an inner surface to which cells attach, and which defines an elongated flow path between inlet and outlet conduits, and a coupling connected to the conduits, the coupling including a body member that supports two projecting rigid conduits disposed parallel to one another, each conduit having an orifice and a puncturing tip adjacent the orifice, a seal member of elastomeric material, the puncturing tips being imbedded in the seal member, and a guide member secured to the seal member and extending parallel to the projecting rigid conduits for sliding movement relative to the body member so that the conduit orifices may be opened by sliding the seal member along the rigid conduits as guided by the guide member to expose the tips of the rigid conduits, the orifices being reclosed by sliding the seal member in the opposite direction away from the body member to reposition the orifices of the rigid conduits in the seal member.

While the sample chamber may have a number of different configurations, in a particular embodiment the sample chamber is an elongated tubular chamber disposed in spiral configuration. Also, in that embodiment, the inlet conduit is of flexible tubing and includes structure disposed within the tubing for cooperation with a peristaltic pump so that a length of tubing may be maintained in tension when trained about the pump cage.

In accordance with another feature of the invention, there is provided a manifold subassembly that includes manifold conduits of elastic material that cooperate with the chamber coupling. The manifold structure in a particular embodiment includes a receptacle for receiving the seal member of the coupling in position so that movement of the body member towards the sealing member forces the orifices of the rigid conduits through the seal member and into the cooperating manifold conduits to establish a flow path between those manifold conduits and the seal connector chamber for flow of liquid media from one of the manifold conduits through one of the rigid conduits and the inlet conduit to the chamber and return through the outlet conduit and the other rigid conduit to the second manifold conduit.

In accordance with still another feature of the invention there is provided a cell culture system which includes an incubator chamber, support in the chamber for a plurality of cell culture chambers, a manifold structure having supply and return conduits, coupling structure for connecting the cell growth chambers to the manifold structure, a connecting conduit extending between the return and supply conduits, a valve and a pH sensor in the connecting conduit, a carbon dioxide sensor in the incubator chamber, a first control responsive to the pH sensor for controlling the introduction of carbon dioxide to the incubator chamber, and a second control responsive to the carbon dioxide sensor for operating the valve to discard at least a portion of the nutrient media circulating in the system and replace such discarded portion with fresh nutrient media. Components of this system in a particular embodiment are replaceable and steam strerilizable and thus provide a high degree of sterility and convenience in use in an arrangement particularly adapted for large scale cell culture.

Other objects, features and advantages of the invention will be seen as the following description of a particular embodiment progresses, in conjunction with the drawings, in which:

FIG. 7 is a plan view of coupling structure of a cell culture unit and a cooperating manifold coupling, partially in section;

FIG. 8 is a view similar to FIG. 7 showing the coupling structures in a second position;

Figure 1:
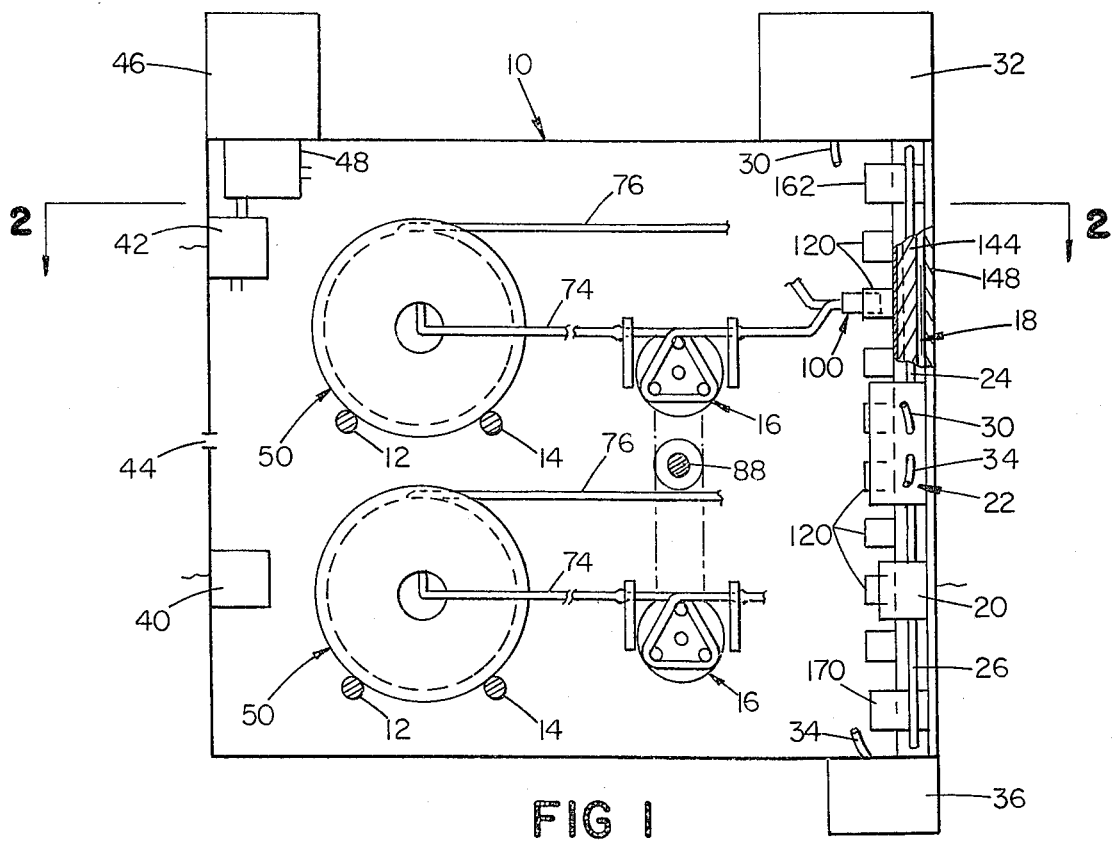
FIG. 1 is a diagrammatic side view of a cell culture system.
Figure 11:
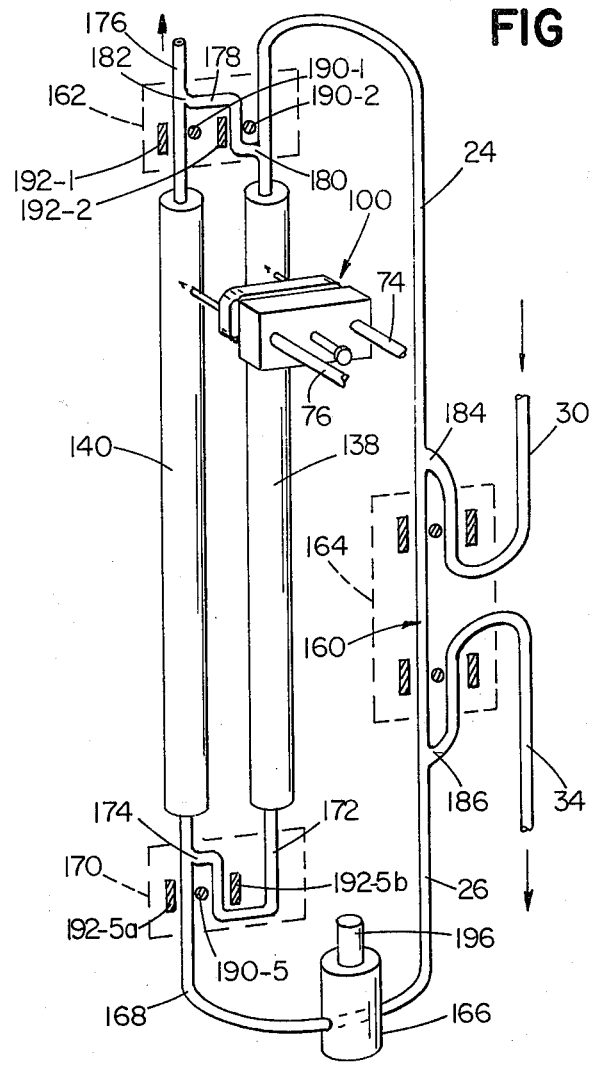
Figure 12:
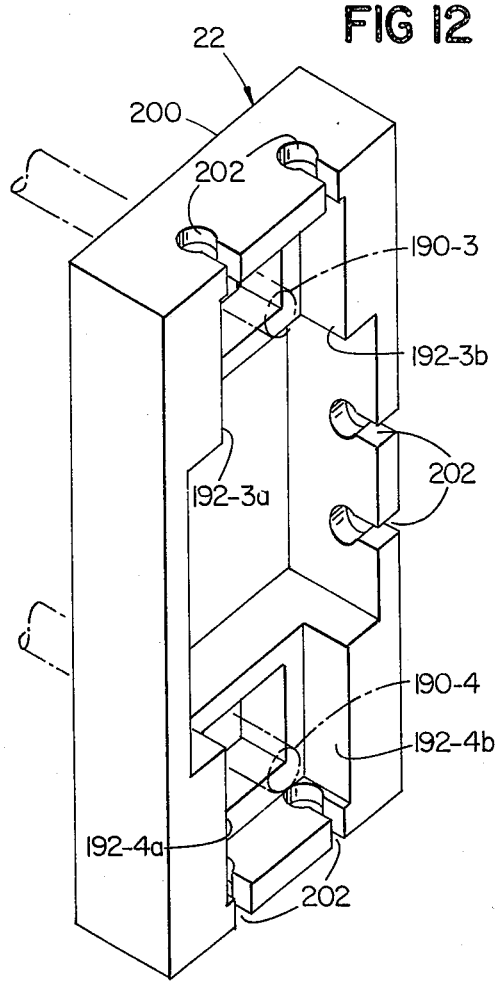
Figure 13:
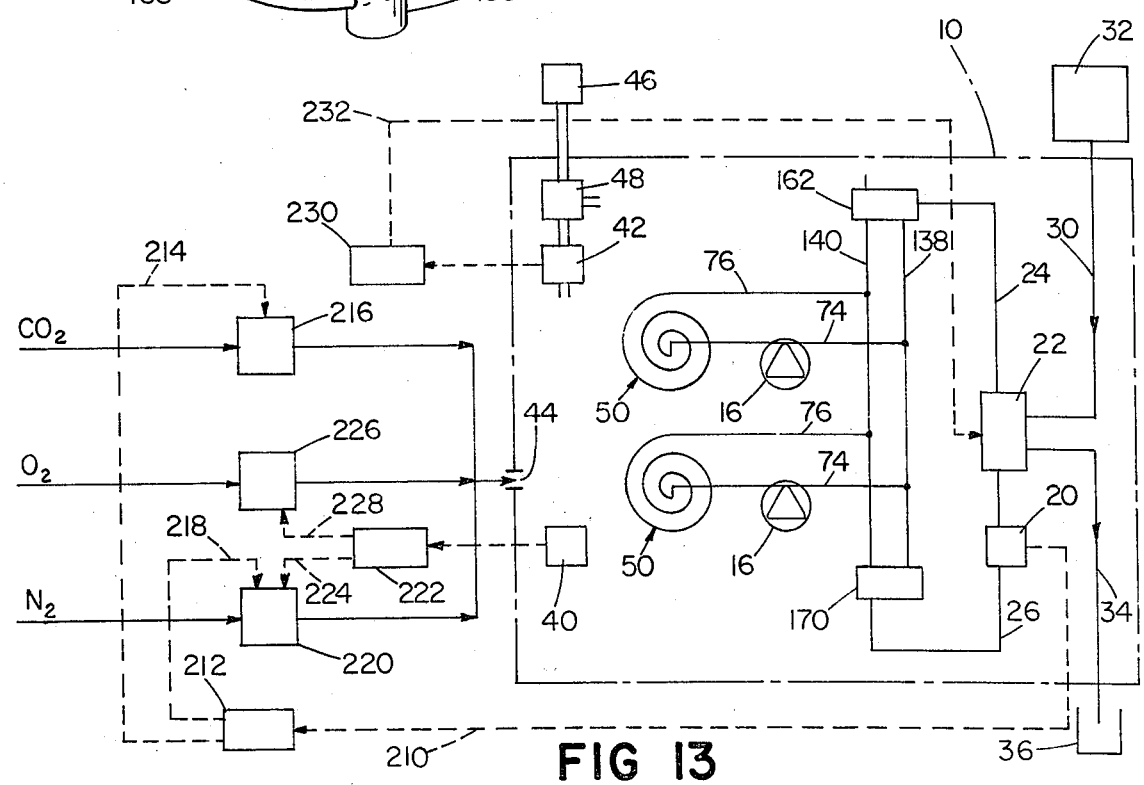

FIGS. 9 and 10 are sectional views taken along the lines 9—9 and 10—10, respectively, of the coupling structures shown in FIG. 8;

FIG. 11 is a perspective view showing features of the coupling and manifold structure and associated valving;

FIG. 12 is a perspective view of a valve housing employed in the system shown in FIG. 11; and FIG. 13 is a diagram indicating control aspects of the system shown in FIG. 1.

DESCRIPTION OF PARTICULAR EMBODIMENT

Figure 2:
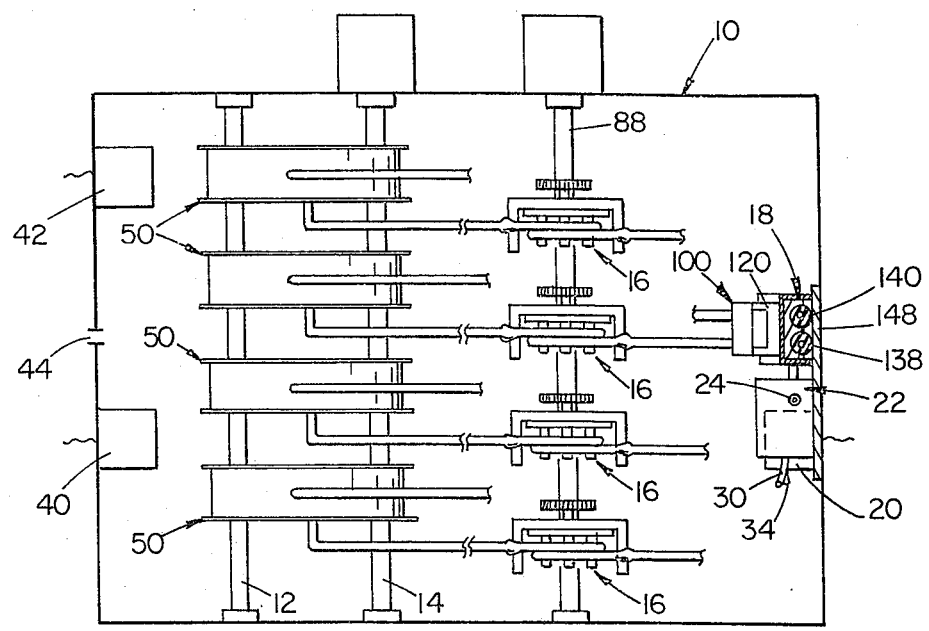
FIG. 2 is a sectional view of the system taken along the line 2—2 of FIG. 1.

With reference to FIGS. 1 and 2, there is diagrammatically shown an incubator 10, the interior of which is held at a precisely controlled, uniform temperature by suitable heating sources and controls in conventional manner. Disposed in incubator 10 are support elements 12, 14, a series of peristaltic pump cages 16, and a manifold structure 18. Mounted adjacent manifold structure 18 is a pH sensing unit 20 and a valve unit 22. The valve has, in addition to conduit 24 connected to the upper end of manifold structure 18 and conduit 26 connected via pH sensing unit 20 to the lower end of manifold structure 18, an inlet conduit 30 connected to a supply of nutrient media 32 and an outlet conduit 34 connected to container 36. Other sensors in the incubator chamber include oxygen sensor 40 and carbon dioxide sensor 42. Oxygen, nitrogen, and carbon dioxide are supplied through port 44 to the incubator chamber, and a source 46 of calibrating carbon dioxide is connected to sensor 42 through valve 48.

Figure 3:
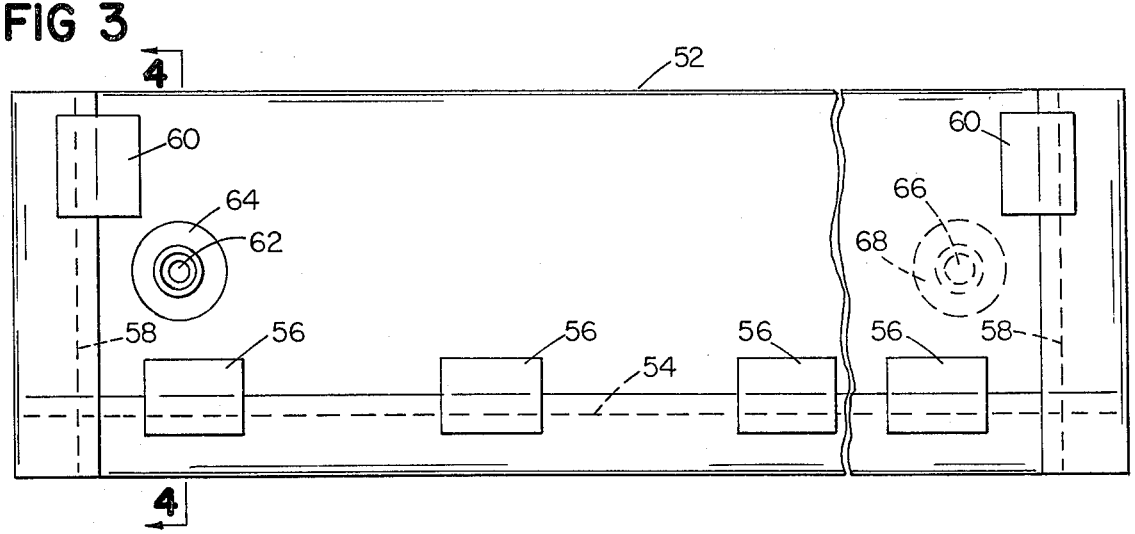
FIG. 3 is a plan view, with parts broken away, of a cell culture chamber employed in the system shown in FIG. 1.
Figure 4:
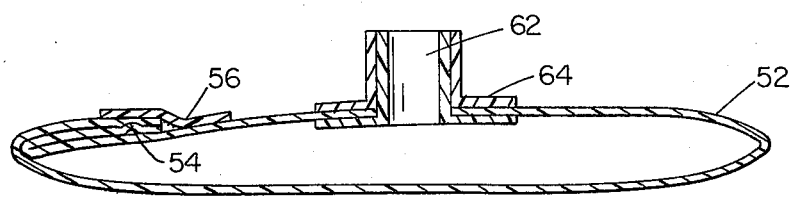
FIG. 4 is a sectional view of the culture chamber taken along the line 4—4 of FIG. 3.
Figure 5:
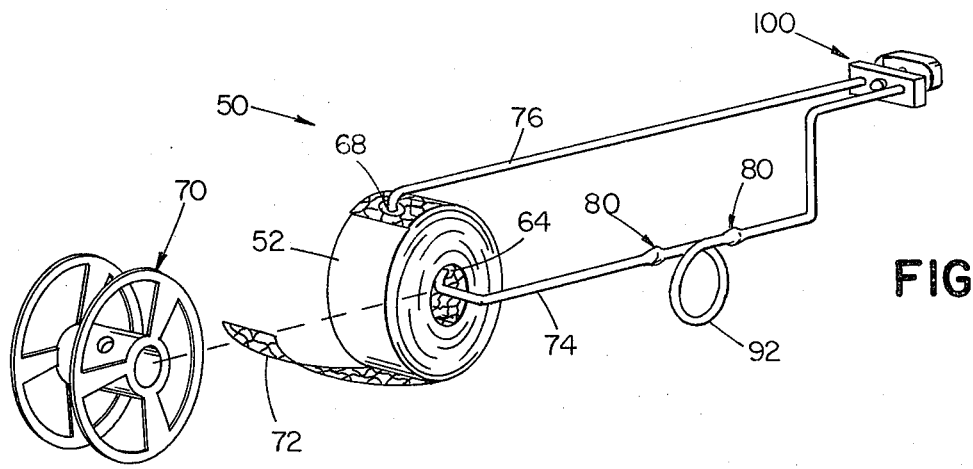
FIG. 5 is a perspective view of components of a detachable cell culture unit for use in the system shown in FIG. 1.

The system illustrated in FIGS. 1 and 2 is arranged to receive detachable cell culture units 50, additional details of which may be seen with reference to FIGS. 3–5. Each cell culture unit includes an elongated chamber 52 which in this particular embodiment has a length of twenty-four feet and a width, as viewed in FIG. 3, of 2½ inches. The chamber is made of a sheet (one mil thick) of fluorinated ethylene-propylene copolymer (Teflon FEP) one surface of which has been chemically etched. The sheet has been folded in half and the two longitudinal edges heat sealed together along the line 54. The heat sealed edge is then folded over as indicated in FIG. 4 and the edge portion secured in place at invervals along the length of the chamber by adhesive tape 56. A similar seal is made at each end by heat seal 58 and secured with tape element 60. The composite seals provide a chamber that is steam sterilizable and withstands fluid pressures of flows nutrient media. Inlet port 62 is defined by coupling 64 at one end of chamber 52 and similarly outlet port 66 is similarly defined by coupling 68. This chamber is impermeable to liquids but permeable to gases. Its chemically etched inner surface provides a surface to which cells to be cultured adhere.

Figure 6:
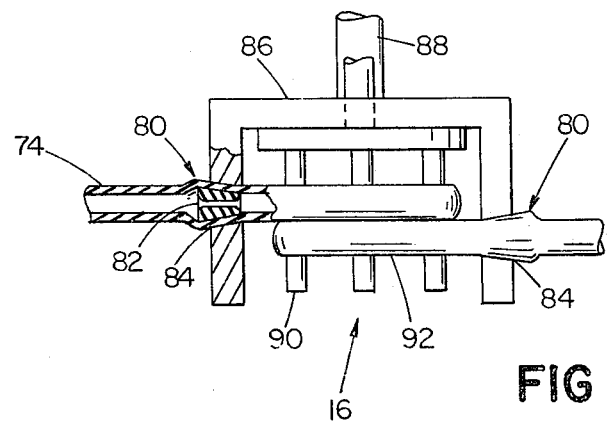
FIG. 6 is a diagrammatic view, partially in section, of peristaltic pump structure employed in the system shown in FIG. 1.

Chamber 52 is spirally wound on reel 70 (FIG. 5) with a spacer interlayer 72 that maintains the adjacent turns of the spiral spaced from one another to permit gas to contact with surfaces of the chamber 52 along the length of the spiral. Input conduit 74 is connected to inlet connector 64 and output conduit 76 is connected to outlet connector 68. Disposed in inlet conduit 74 are two tube locks 80, additional details of which may be seen with reference to FIG. 6.

Each tube lock 80 is a frustoconical member that has a bore 82, the ends of which are flared to promote smooth flow. The lock 80 expands the peristaltic tubing 74 and is adapted to cooperate with a similarly tapered aperture 84 in frame member 86 of the peristaltic pump 16 on which the drive shaft 88 for the pump cage 90 is mounted. The tube locks 80 are spaced apart in the peristaltic tubing 74 a predetermined distance so that the tube is under tension when the loop 92 is wound about the pump cage 90 and the tube locks 80 are secured in recesses 84. This arrangement provides a simple sterilizable mechanism for positively securing the tubing under tension about the pump cage 90.

Secured to the ends of conduits 74 and 76 is a coupling structure 100, additional details of which may be seen with reference to FIG. 7. The coupling 100 includes a body structure 102 which houses two connector structures 104 to which the inlet and outlet conduits 74, 76 are attached. Extending forward from each coupling structure 104 is a rigid metal conduit 106 in the form of a hypodermic needle having a sharp tip 108 and a port in the tip. The tips of the needles are encapsulated in an elastomeric (gum rubber) sealing member 110. Secured to sealing member 110 is guide shaft 112 which extends rearwardly through an aperture 114 in body member 102. Stop 116, mounted on shaft 112 limits the forward movement of that shaft and seal member 110. An interlock notch 118 may be provided for facilitating orientation of the coupling structure.

Cooperating with coupling 110 is a manifold coupling structure 120 which is mounted on the manifold structure 18. The manifold structure includes a frame member 122 on which are mounted a series of coupling structures 120 as shown in FIGS. 7 and 10. Each structure includes a base 126, two side walls 128 and a front wall 130 that define a receptacle 132 for receiving the guard member. Interlock projection 134 is adapted to cooperate with interlock notch 118. Formed in manifold frame 122 in line with each receptacle 132 are two apertures 136 which are aligned with manifold tubes 138, 140, respectively. Each tube 138, 140 is disposed in a corresponding longitudinally extending recess 144 of securing member 146 and retained in position by plate 148.

In operation of the cooperating coupling structures, the chamber coupling assembly 100 is initially sealed by the fact that the inlet and outlet orifices are disposed in and sealed by the elastomeric seal member 110. To connect a culture chamber assembly to the manifold structuure 18, the seal member 110 is inserted and frictionally held in position in receptacle 132 (notch 118 cooperating with projection 134 to insure the insertion of the seal member 110 in proper orientation). After the seal member has been seated in receptacle 132, the body portion 102 is urged forward, as guided by rod 112, forcing the needle tips through the elastomeric seal material, the passageways 136 in manifold assembly and the elastomeric walls of manifold conduits 138, 140 into the position shown in FIG. 8. In that position the orifices in tips 108 are disposed in the manifold conduits 138, 140 and the culture chamber 52 is in fluid communication with the manifold conduits.

To separate the coupling structures, the body member 102 is pulled rearwardly against stop 116, withdrawing the needle tips from the manifolds 18 and placing them within the seal member 110. The elastomeric characteristics of the conduits 138, 140 and the seal member 110 cause the punctures to immediately reseal in both the culture chamber inlet and outlet passages and the manifold conduits 138, 140.

Additional details of the manifold tubing subassembly may be seen with reference to FIG. 11. That subassembly is replaceable and includes the two elastomeric manifold tubes 138, 140 and peristaltic connecting conduits. The upper end of inlet tube 138 is connected to tubing 160 (conduits 24 and 26) which extends through valve 162, and valve 164 to pH sensor cuvette 166. The other port of cuvette 166 is connected to tubing 168 which extends through valve 170 to the lower end of outlet manifold tube 140. The lower end of inlet manifold tube 138 is connected to tube 172 which extends through valve 170 and is connected to tube 168 at junction 174. The upper end of outlet manifold tube 140 is connected to vent tube 176 which extends to atmosphere and a junction tube 178 extends from junction 180 with tube 160 to junction 182 with tube 176 (through valve 162). Supply tube 30 extends through valve 164 and is connected to tube 160 at junction 184 while discharge tube 34 extends through valve 164 and is connected to tube 160 at junction 186.

Each valve 22, 164 and 170 includes one or more operator rods or bars 190 which cooperate with backup surface 192 so that when the valve rod is moved towards a cooperating backup surface, it compresses the interposed peristaltic tubing to provide a seal. In valve 162, there are two valve rods 190-1 and 190-2 and three backup surfaces, rod 190-1 cooperating with backup surface 192-1 and rod 190-2 cooperating with backup surface 192-2. The rods are mounted for movement as a unit and when they are moved to the left (into their normal position), rod 190-1 closes the vent line 182 to the outlet manifold 140 and rod 190-2 closes via junction line 178, the vent to inlet manifold 138. When the rods are moved to the right, the vents to both manifolds are opened.

With reference to valve 22, that valve includes valve rod 190-3 (which cooperates with backup surfaces 192-3a and 192-3b) and valve rod 190-4 (which cooperates with backup surfaces 192-4a and 192-4b). The rods are mounted for movement as a unit and when in their right (normal) position (compressing the tube against surfaces 192-3b and 192-4b), conduit 160 is open and completes a path from the bottom of outlet conduit 140 through the pH sensor cuvette 166 to the top of inlet manifold 138. When the valve rods are moved to the left, that path is closed and a supply path through conduits 30 and 160 to the top of inlet manifold 138 is opened and a discharge path is similarly opened from the lower portion of conduit 140 to discharge conduit 34.

Similarly, valve 170 has two positions, a first position in which valve rod 190-5 compresses tube 168 against backup surface 192-5a and opens the connector conduit 172 to connect the lower ends of the two manifolds together; and a second position in which the rod compresses junction conduit 172 against backup surface 192-5b, closing the junction conduit and opening conduit 168, permitting flow of liquid from the outlet manifold to the pH cuvette 166.

Additional details of the construction of a portion of valve 22, which is typical of the three valves, is shown in FIG. 12. As indicated in that figure, there is a valve housing 200 in which are formed slots 202 for receiving the tubing sections in releasably secured manner so that the tubing may be removed easily for ready replacement. The manifold sections 138, 140 preferably are permanently connected to the peristaltic tubing sections and the entire subassembly may be readily replaced as a unit. The sections are plugged into the pH electrode cuvette 166 and that cuvette is steam sterilizable as is the cooperating pH electrode 196, which in a particular embodiment is a combination pH electrode.

A system flow and control diagram is indicated in FIG. 13. As there indicated, the chamber units 50 are connected to the inlet and outlet manifolds 138, 140, respectively, positive displacement peristaltic pumps 16 being connected to the inlet lines 74 of the sample chamber units. Supply line 30 is connected to nutrient supply container 32 and discharge line 34 is connected to sump 36. pH sensor 20 monitors the hydrogen ion concentration in the liquid leaving the discharge manifold 140 and its output signal is applied over line 210 to controller 212 which has output 214 connected to carbon dioxide controller 216 and output 218 connected to nitrogen controller 220. Oxygen sensor 40 in the gaseous environment in incubator chamber 10 provides an output signal through controller 222 to control nitrogen controller 220 (line 224) and oxygen controller 226 (line 228). Carbon dioxide sensor 42 is disposed in the gas stream which is circulated through the incubator 10 and in series with valve 48. As periodic calibration is desirable, valve 48 is periodically operated, e.g., one minute for each hour of operation, to flow calibrated carbon dioxide from source 48 past sensor 42 to provide a calibration or reference signal which is stored in controller 230. In the remainder of the hour cycle, the gas in the incubator enclosure is monitored by sensor 42 and an output on line 232 is applied to operate the controller of valve 22.

In operation, the chamber reels 70 are positioned on supports 12 in the incubator chamber, the inlet lines 74 trained about the peristaltic pump cages 90 and secured by positioning the tube locks 80 in notches 84; and the connectors 100 are positioned in the receptacles 132 and then moved into operative connection with manifolds 138, 140.

The manifolds 138, 140 are filled with the liquid nutrient from supply 32 (either prior or subsequent to connecting the culture chambers) by operating valve 22 to close coupling line 160, valve 162 to vent the two manifold chambers 138, 140, and valve 170 to connect the lower ends of the two manifold chambers together. The nutrient then flows from supply 32 under gravity into the two manifold chambers and fills them, any air being vented through line 176.

The cells or tissue may be introduced into the chambers 52 through one of the terminal openings together with an amount of nutrient media, or a cell suspension may be injected through the wall of the container into the nutrient media by means of a syringe. The puncture is sealed spontaneously by the resilient sheet chamber material upon withdrawal of the needle. During the filling of the spiral chambers with nutrient material, the reels 70 may be driven in rotation at a very low rate of speed to assist in displacing gases and improve contact of the nutrient material with the cells. After the cells are introduced and distributed through the spiral chambers, the system is maintained static for an interval to facilitate the attachment of cells to the roughened inner walls of the chambers.

While cells are being grown in the chambers 52, the incubator 10 is held at desired conditions of humidity and temperature, typically 37°C, and the pH of the circulating nutrient media, and the partial pressure of oxygen in the gas phase is monitored and the partial pressure of the carbon dioxide in the gas phase is adjusted to maintain the pH of the liquid media at a selected value, typically about 7. The lengths of chambers 52 assure that liquid in the circulation system and the gas phase in the enclosure of the incubator 10 are in gas equilibrium through the permeable walls of the chambers 52. The output of pH sensor 20 controls the carbon dioxide and nitrogen controllers 216 and 220, additional carbon dioxide being admitted when pH rises and reduced amount of carbon dioxide being admitted when the pH falls. Oxygen and nitrogen are admitted continuously at low flow rates and controlled to maintain the desired partial pressure of oxygen in the incubator 10.

After an interval of time, the accumulation of components, such as lactic acid which is produced by many growing cells, in the circulating nutrient media may make it impossible to maintain the desired pH by reducing the amount of carbon dioxide in the chamber. When the amount of carbon dioxide in the chamber drops below a selected value, the output of controller 230 shifts valve 22 so that at least a portion of the circulating nutrient media is transferred through discharge line 34 and replaced by fresh media uncontaminated by the products of cell metabolism through supply conduit 30.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. A replaceable, sterilizable, cell growth assembly comprising a chamber of gas permeable liquid impermeable material having an inner surface to which cells are attachable, and which defines an elongated flow path between inlet and outlet conduits, a coupling connected to said conduits, said coupling including a body member that supports two projecting rigid conduits, each said rigid conduit having an orifice and a puncturing tip adjacent said orifice, a seal member of elastomeric material, said puncturing tips being imbedded in said seal member, and a guide member secured to said seal member and extending parallel to said projecting rigid conduits for sliding movement relative to said body member so that said conduit orifices may be opened by sliding said seal member along said rigid conduits as guided by said guide member to expose the tips of said rigid conduits, said orifices being reclosed by sliding said seal member in the opposite direction away from said body member to reposition said orifices of said rigid conduits in said seal member.

2. The assembly as claimed in claim 1 wherein said chamber is an elongated tubular chamber disposed in spiral configuration.

3. The assembly as claimed in claim 1 wherein said inlet conduit is of flexible tubing and includes structure disposed within the tubing for cooperation with peristaltic pump structure so that a length of said tubing may be maintained in tension when trained about the cage of said peristaltic pump.

4. The assembly as claimed in claim 1 and further including a cooperating manifold structure comprising a manifold subassembly that includes manifold conduits of elastomeric material that cooperate with said chamber coupling structure.

5. The assembly as claimed in claim 4 wherein said manifold structure includes a receptacle for receiving said seal member of said coupling in position so that movement of said body member towards said sealing member forces the orifices of said rigid conduits through said seal manner and into the cooperating manifold conduits to establish a flow path between said manifold conduits and said rigid conduits for flow of liquid media from one of said manifold conduits through one of said rigid conduits and said inlet conduit to said chamber and return through said outlet conduit and the other rigid conduit to the second manifold conduit.

6. The assembly as claimed in claim 5 wherein said chamber is an elongated tubular chamber disposed in spiral configuration.

7. The assembly as claimed in claim 6 wherein said inlet conduit is of flexible tubing and includes tapered tube lock structure disposed within the tubing and defining a flow path past the tube lock structure within said tubing for cooperation with peristaltic pump structure so that a length of said tubing may be maintained in tension when trained about the cage of said peristaltic pump.

* * * * *